No. 812,563. PATENTED FEB. 13, 1906.
M. G. HEITZ-BOYER.
VEHICLE WHEEL.
APPLICATION FILED JULY 25, 1905.
3 SHEETS—SHEET 1.
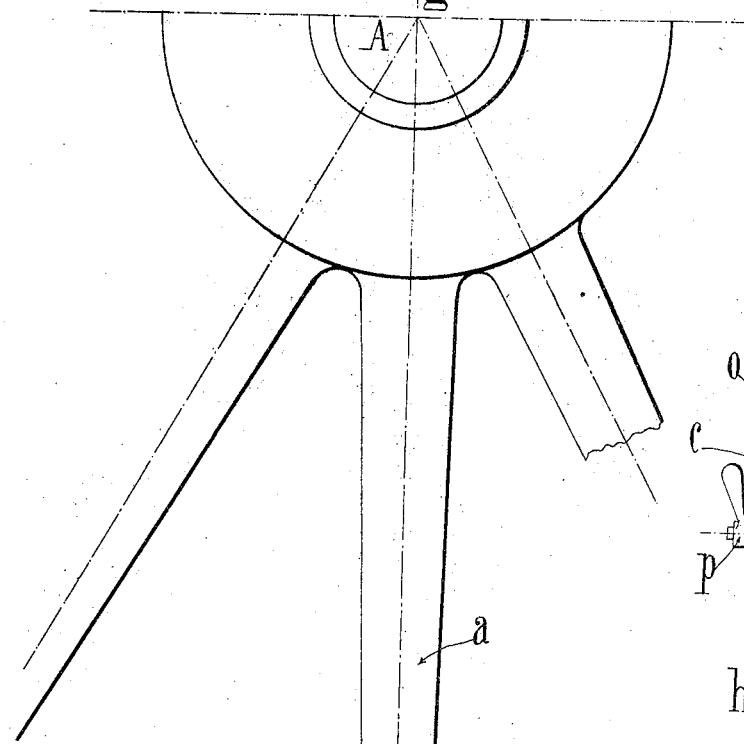
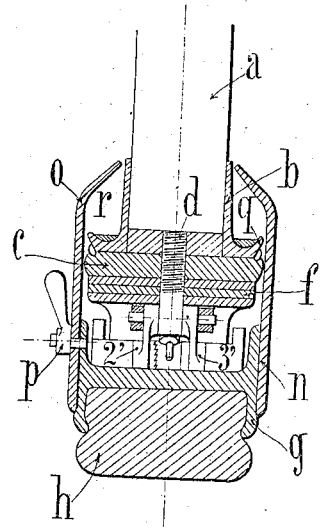
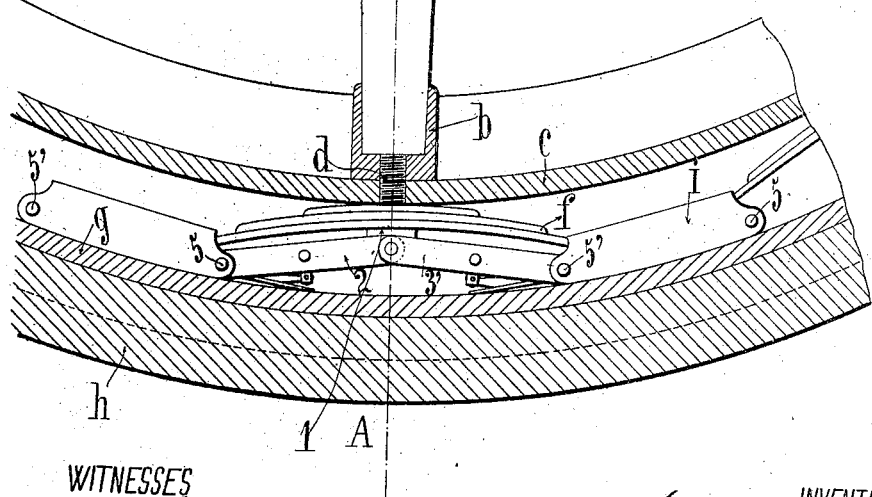
WITNESSES
Henry J. Suhrbier.
Fannie Fisk
INVENTOR
Maurice Georges Heitz-Boyer
BY
ATTORNEYS No. 812,563. PATENTED FEB. 13, 1906.
M. G. HEITZ-BOYER.
VEHICLE WHEEL.
APPLICATION FILED JULY 25, 1905.
3 SHEETS—SHEET 2.
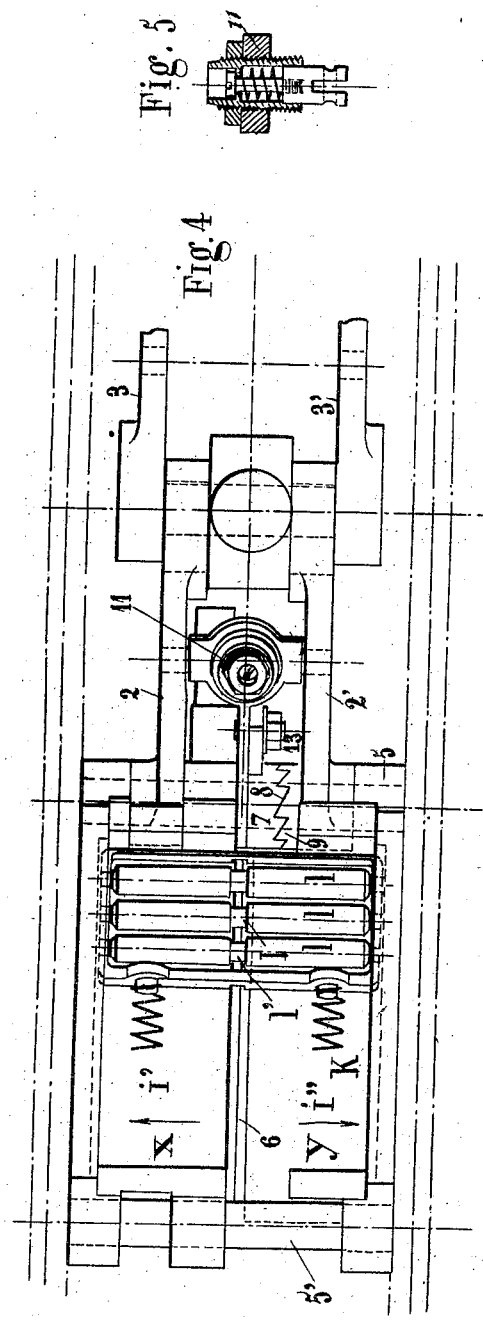
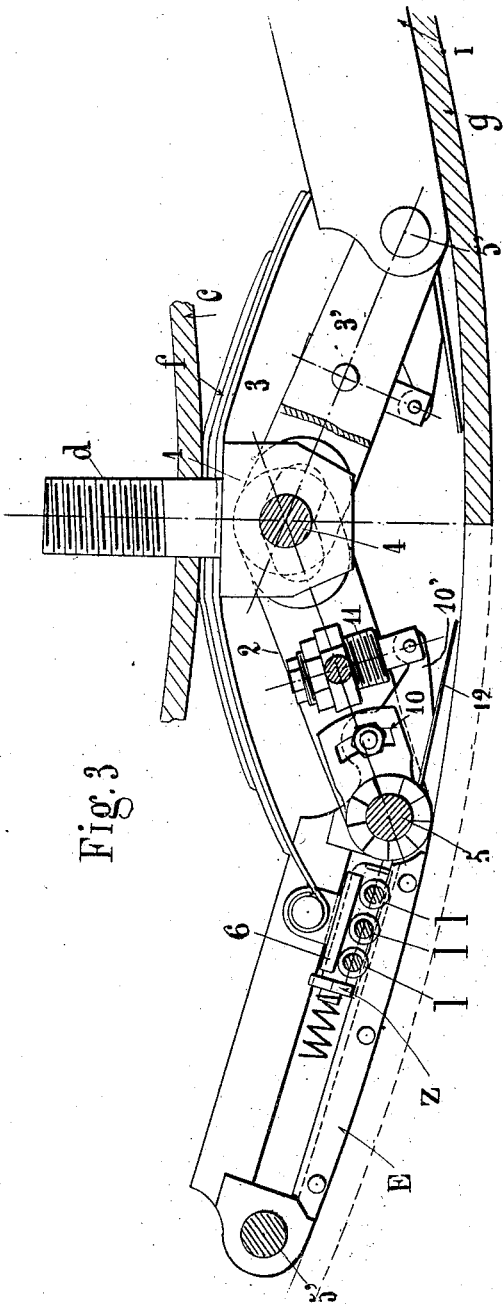
WITNESSES
INVENTOR
Maurice Georges Heitz-Boyer
BY
ATTORNEYS

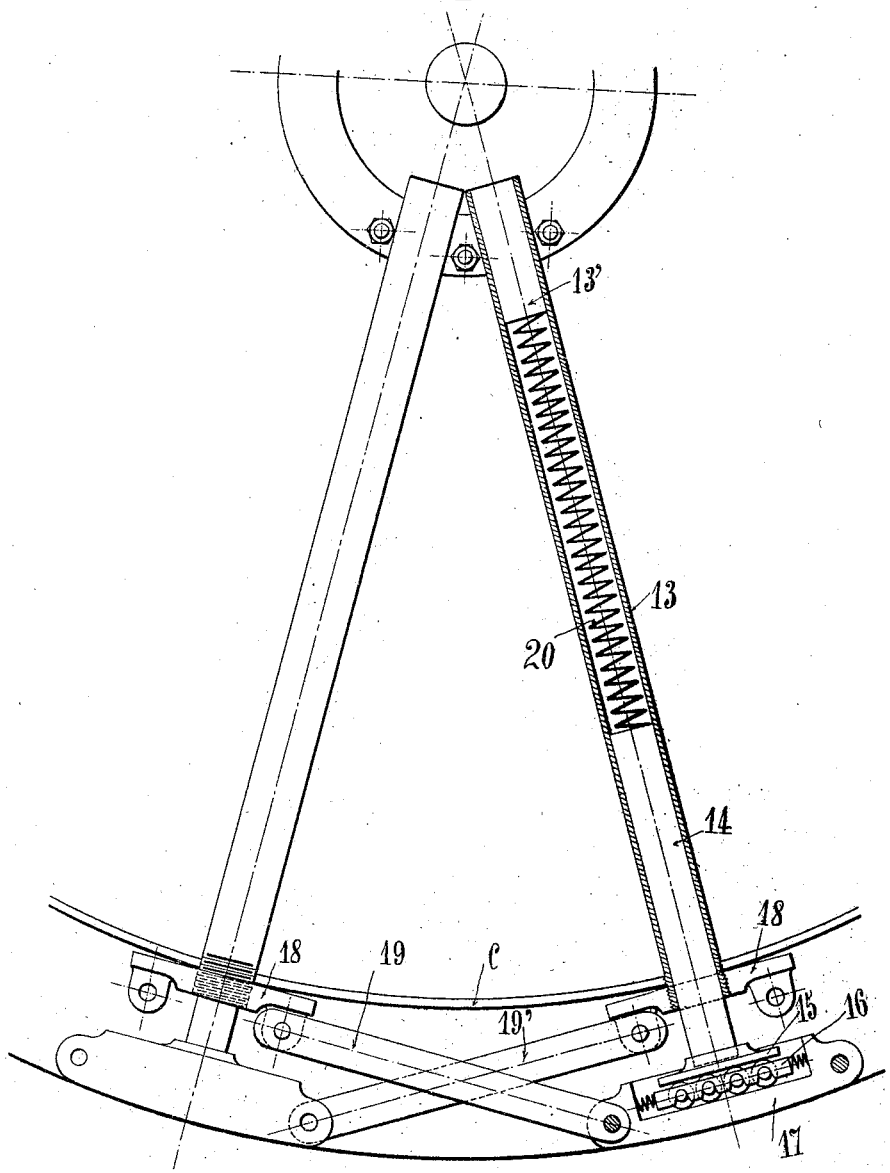

UNITED STATES PATENT OFFICE.

MAURICE GEORGES HEITZ-BOYER, OF PARIS, FRANCE.

VEHICLE-WHEEL.

No. 812,563.          Specification of Letters Patent.          Patented Feb. 13, 1906.

Application filed July 25, 1905. Serial No. 271,213.

*To all whom it may concern:*

Be it known that I, MAURICE GEORGES HEITZ-BOYER, a citizen of the Republic of France, and a resident of Paris, in said Republic of France, have invented certain new and useful Improvements in Vehicle-Wheels, of which the following is a specification.

This invention relates to a wheel with a flexible or spring rim, which renders it unnecessary to make use of pneumatic tires, which present serious drawbacks due to their being so easily damaged by puncture, bursting, &c., and to their wearing out quickly when carrying heavy loads.

The above-mentioned drawbacks are avoided in the wheel with flexible or spring rim according to this invention.

Figure 1 is an elevation, partly in section, of a portion of the wheel. Fig. 2 is a vertical section on the line A A of Fig. 1. Fig. 3 is a detail view, on a larger scale, of two adjacent elements of the rim with their connecting device. Fig. 4 is a plan thereof. Fig. 5 is a detail view of the plunger device, and Fig. 6 shows a modified construction.

The end of each of the spokes $a$, connected to the hub, engages in a socket $b$, the bottom of which is provided with a tapped hole, which is so arranged that when the wheel is being erected it coincides with one of the holes made in a metal ring or inner rim $c$. The holes in this ring are plain, so that pins no studs $d$, secured in the tapped holes of the sockets $b$, can pass through the said plain holes. As shown in Fig. 1, leaf-springs $f$ are inclosed between the heads 1 of the pins $d$ and the ring $c$.

The rim proper chiefly comprises a part $g$, having such cross-section that it can receive on the outer surface a solid or cushion rubber or leather tire and on the inner side blocks or shoes $i$, provided with pivoted bottom plates 6, to which are hooked the bent ends of the large blades of the leaf-springs $f$. These blades rest, through the intermediary of the plates 6, on small carriages or slides provided with a number of rollers $l$, owing to which the carriages can move to and fro on the bottom of the blocks or boxes. In the event of a shock two small helical springs act on the frames $z$ and replace them in their original position if they have moved.

The tire is completed by two metal or other lateral walls $n$ $o$. One wall $n$ is secured, by means of screws or rivets, to the rim $g$, Fig. 2, while in order to enable repairs to be executed the other wall $o$ is made removable by means of nuts $p$, which secure it to the other side of the rim $g$ and can be easily removed. It need not be pointed out that the removable wall $o$ should always be on the outside of the wheel.

All around the metal ring or inner rim $c$ pass two leather bands $q$ $r$, the sides of which rest, respectively, against the walls $n$ $o$ of the rim, so as to prevent sand and dirt from getting into the interior.

In order to prevent the block-boxes $i$ from sliding during the rotation of the wheel, on the inner wall of the rim $g$ a device is provided for jamming the blocks against the lateral walls $n$ and $o$. The rim is therefore caused to participate in the movement, both owing to the adhesion of the bottom of the blocks to the inner wall of the rim and by the jamming of the lateral faces of the said blocks against the sides of the latter. The jamming device is shown in detail in Figs. 3, 4, and 5. For this purpose to the head 1 of each spoke is attached a system of toggle rods or links 2 2' 3 3' in oppositely-directed pairs, each of which links is provided with an elongated opening, through which passes a spindle 4. One pair of rods 2 2' is hinged to the left-hand block and the other pair 3 3' to the right-hand block. The blocks $i$, Figs. 3 and 4, are made in two longitudinal parts $i'$ and $i''$, connected together merely by end pins 5 5', with which the outer ends of the links engage and on which pins the two parts $i'$ $i''$ can move laterally. These parts $i'$ $i''$ can therefore be moved away from each other, (by means of a device hereinafter described,) so as to produce jamming against the sides of the rim.

The rollers $l$, on which the spring-plates 6 rest, are provided with a central groove $l'$, with which engages a longitudinal projection secured to one of the parts $i'$ of the block and the object of which is to guide the carriage at a suitable distance from the longitudinal edges of the block, the said edges being capable of moving apart or nearer together.

The moving apart of the two parts $i'$ $i''$ of the block is effected in the following manner: On the pin 5, on which are mounted the outer ends of one pair of links 2 2', is arranged between the said links a clutch-sleeve 7, which is provided on one side at 8 with ratchet-teeth engaging with corresponding teeth on a second sleeve 9, secured to one of the links 2'. The first-named sleeve 7 is connected by an arm 10 to a piston or plunger, Fig. 5, which can move in a cylinder 11, where it is exposed to the action of a spring and forms a plunger device. The cylinder 11 can swing on two pivots, which loosely engage holes in the links 2 and 2'. The arm 10 is provided with an angularly-adjustable extension 10', to which is secured the plunger device just mentioned and a leaf-spring 12, bearing against the part $g$ of the rim.

When one leaf-spring $f$ of the wheel yields, the corresponding pin 4 is lowered and causes the toggle-links 2 2' to participate in its movement. At the beginning of that movement the arm 10 is also caused to move, and the two clutch-sleeves 7 and 9 rotate about the link-pin 5, while remaining in engagement with each other. As soon as the spring-blade 12 as it is compressed against the bottom of the rim begins to exercise on the arm 10 a greater pressure than that exercised in the opposite direction on the same arm by the spring of the intermediate plunger device the arm 10 stops and only the cylinder 11 continues to descend relatively to the plunger, while the spring of the plunger device is compressed. The arm 10, as well as the clutch-sleeve 7 standing still and the link 2' contributing, on the contrary, to the descent by still continuing to turn the fixed clutch-sleeve 9, the two sleeves will move away from each other, owing to the shape of their teeth. During this movement one clutch-sleeve 7 will push one part $i'$ of the block out laterally in the direction of the arrow $x$, Fig. 4, and the other sleeve 9 will push the other part $i''$ of the block in the direction of the arrow $y$, Fig. 4. The clearance existing during the position of rest between the edges of the rim and the sides of the block being limited, the block will become jammed against the sides of the rim. In these conditions the driving of the rim will be effected not only by the adhesion of the blocks to the bottom of the rim, but also by the jamming of the said blocks against its sides.

The extension 10' of the arm 10, secured to the clutch-sleeve 7, is adjustably connected to said arm by a pin passing through a hole in one of the parts and engaging with a recess in the other. In this way the inclination of the arm 10 can be regulated as desired by pivotally adjusting said extension and the moment at which the two clutches move apart determined. When after a prolonged use these clutches have become slightly worn, a suitable adjustment will enable the wear to be compensated.

In the modified construction shown in Fig. 6 the spokes are constituted by tubes 13, arranged between the hub and the ring or inner rim $c$, and in each spoke moves a piston 14, provided at its outer end with a plate 15, traveling on the rollers of a carriage 16, arranged in the block 17. The blocks 17 are connected to plates or disks 18, mounted on the outer ends of the tubes 13, forming the cylinders of the pistons, by means of toggle-links 19 19', which cross each other in pairs in the manner shown in the drawings. A helical spring 20 is inserted in each of the tubular spokes between the piston 14 and the bottom 13' of the tube 13. In this construction the driving of the rim is effected by the adhesion of the blocks, which adhesion is assisted by the links or levers 19 19', which have the tendency to move the blocks apart in the portion of the wheel in contact with the ground and in the adjoining portions.

Having thus described my invention, I claim as new and desire to secure by Letters Patent—

1. In a vehicle-wheel, the combination, with a rim, of a plurality of blocks bearing against the same, toggle-links connecting certain of said blocks at either side thereof, and spokes forming in connection with said links a plurality of toggle-joints.

2. In a vehicle-wheel, in combination, with the rim, a plurality of blocks bearing against the same, toggle-links connecting certain of said blocks, and spokes directly connected with the joints of said toggle-links.

3. The combination, with the rim and the spokes, of shoes or blocks movable longitudinally to the former and disposed toward and between the latter, and toggle-links connecting adjacent shoes and having their intermediate joints connected to the spokes.

4. In a vehicle-wheel, the combination of a rim $g$, shoes $i$ bearing against the same between the spokes, carriages or slides 6 movable longitudinally to said shoes, leaf-springs $f$ connecting adjacent carriages, toggle-links connecting said shoes, and spokes attached to said leaf-springs intermediately between the same and to the intermediate joints of said toggle-links.

5. In a vehicle-wheel, the combination, with the inner and outer rims, of shoes disposed between said rims and bearing against the outer rim, toggle-links connecting adjacent shoes, slides movable longitudinally to said shoes, springs connecting adjacent slides, and spokes protruding into the space between said rims and bearing against the intermediate joints of said toggle-links.

6. In a vehicle-wheel, the combination with a rim having side portions, of a plurality of blocks or shoes movable longitudinally thereto and each divided longitudinally into sections, toggle-links connecting certain of said blocks or shoes, spokes forming in connection with said links a plurality of toggle-joints, and means governed by the movement of said links for laterally separating said block-sections and forcing the same against the sides of said rim.

7. In a vehicle-wheel, the combination with a rim having side walls, of a plurality of blocks or shoes bearing against said rim at the face thereof which is disposed toward the hub, each of said blocks being divided longitudinally into sections, toggle-links connecting certain of said blocks, being attached to the corresponding sections thereof, spokes forming in connection with said toggle-links a plurality of toggle-joints, transverse sleeves carried by each of said block-sections, the sleeves of the sections of the same block having coöperating cam-faces, and springs acting on the sleeve of one block-section of each block for limiting the angular movement thereof.

In testimony whereof I have signed this specification in the presence of two subscribing witnesses.

MAURICE GEORGES HEITZ-BOYER.

Witnesses:
EMILE LEDRET,
H. C. COXE.